(12) United States Patent
Lee et al.

(10) Patent No.: US 9,810,295 B2
(45) Date of Patent: Nov. 7, 2017

(54) PLANETARY GEAR TRAIN OF AUTOMATIC TRANSMISSION FOR VEHICLE

(71) Applicant: Hyundai Motor Company, Seoul (KR)

(72) Inventors: KyeongHun Lee, Seoul (KR); Chang Wook Lee, Suwon-si (KR); JongSool Park, Hwaseong-si (KR); Sueng Ho Lee, Seoul (KR); Dong Hwan Hwang, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/487,639

(22) Filed: Apr. 14, 2017

(65) Prior Publication Data

US 2017/0219061 A1    Aug. 3, 2017

Related U.S. Application Data

(63) Continuation-in-part of application No. 14/941,400, filed on Nov. 13, 2015.

(30) Foreign Application Priority Data

May 6, 2015    (KR) .......................... 10-2015-0063353

(51) Int. Cl.
*F16H 3/66*    (2006.01)

(52) U.S. Cl.
CPC ....... *F16H 3/66* (2013.01); *F16H 2200/0069* (2013.01); *F16H 2200/0073* (2013.01);
(Continued)

(58) Field of Classification Search
CPC ....................................................... F16H 3/66
See application file for complete search history.

(56) References Cited

U.S. PATENT DOCUMENTS 8,840,520 B2    9/2014    Neelakantan
8,915,819 B2    12/2014    Coffey
(Continued)

FOREIGN PATENT DOCUMENTS

KR    10-2013-0031453 A    3/2013
KR    10-2013-0031456 A    3/2013
(Continued)

*Primary Examiner* — Derek D Knight
(74) *Attorney, Agent, or Firm* — Morgan Lewis & Bockius LLP

(57) ABSTRACT

A planetary gear train may include an input shaft, an output shaft, four planetary gear sets having first to twelfth rotation elements, a first shaft connected with the first rotation element and selectively connectable with a transmission housing, a second shaft interconnecting the second and fourth rotation elements, and connected with the input shaft, a third shaft interconnecting the third rotation element and the tenth rotation element, a fourth shaft connected with the fifth rotation element, a fifth shaft interconnecting the sixth and seventh rotation elements, and selectively connectable with the first shaft, a sixth shaft connected with the eighth rotation element and selectively connectable with the respective third and fourth shaft and selectively connectable with the transmission housing, a seventh shaft interconnecting the ninth and twelfth rotation elements, and selectively connectable with the transmission housing, and an eighth shaft connected with the eleventh rotation element and the output shaft.

13 Claims, 5 Drawing Sheets

(52) U.S. Cl.
CPC ........... *F16H 2200/2012* (2013.01); *F16H 2200/2048* (2013.01)

(56) References Cited

U.S. PATENT DOCUMENTS

| | | |
|---|---|---|
| 8,939,863 B2 | 1/2015 | Hart |
| 8,992,371 B1 | 3/2015 | Shim |
| 9,217,493 B2 | 12/2015 | Lippert |
| 9,279,478 B2 | 3/2016 | Mellet |
| 2017/0114868 A1* | 4/2017 | Hwang .................... F16H 3/66 |
| 2017/0114869 A1* | 4/2017 | Hwang .................... F16H 3/66 |
| 2017/0159766 A1* | 6/2017 | Hwang .................... F16H 3/66 |
| 2017/0159768 A1* | 6/2017 | Park ........................ F16H 3/66 |

FOREIGN PATENT DOCUMENTS

| | | | |
|---|---|---|---|
| KR | 10-2014-0046240 A | 4/2014 | |
| KR | 10-1448789 B1 | 10/2014 | |

\* cited by examiner

FIG. 2

| Shift-stage | Control element |||||||Gear ratio | Step ratio | Note |
| --- | --- | --- | --- | --- | --- | --- | --- | --- | --- | --- |
| | C1 | C2 | C3 | C4 | B1 | B2 | B3 | | | |
| D1 | ● | ● | | | ● | | | 4.843 | - | |
| D2 | | ● | ● | | ● | | | 2.88 | 1.682 | |
| D3 | | ● | | | ● | | ● | 1.954 | 1.474 | |
| D4 | | ● | | ● | ● | | | 1.455 | 1.343 | |
| D5 | | ● | | ● | | ● | | 1.178 | 1.235 | |
| D6 | | ● | ● | ● | | | | 1 | 1.178 | Gear ratio span :9.33 |
| D7 | | | ● | ● | | ● | | 0.859 | 1.164 | |
| D8 | ● | | | | | ● | | 0.717 | 1.198 | Ratio of REV vs D1:0.67 |
| D9 | ● | ● | ● | | | ● | | 0.617 | 1.162 | |
| D10 | ● | | | | | ● | | 0.519 | 1.189 | |
| REV | ● | | ● | | | | ● | -3.248 | - | |

FIG. 3

| Shift-stage | Control element | | | | | | |
|---|---|---|---|---|---|---|---|
| | C1 | C2 | C3 | C4 | B1 | B2 | B3 |
| D1 | ● | ● | | | ● | | |
| D2 | | ● | ● | | ● | | |
| D3 | | ● | | | ● | ● | |
| D4 | | ● | | ● | ● | | |
| D5 | | ● | | ● | | ● | |
| D6 | | ● | ● | ● | | | |
| D7 | | | ● | ● | | ● | |
| D8 | ● | | | ● | | ● | |
| D9 | ● | | ● | | | ● | |
| D10 | ● | ● | | | | ● | |
| REV | ● | | ● | | | | ● |

FIG. 4

| Shift-stage | Control element | | | | | | |
|---|---|---|---|---|---|---|---|
| | C1 | C2 | C3 | C4 | B1 | B2 | B3 |
| D1 |  | ● | ● |  | ● |  |  |
| D2 | ● |  | ● |  | ● |  |  |
| D3 |  |  | ● |  | ● |  | ● |
| D4 |  |  | ● | ● | ● |  |  |
| D5 |  |  | ● | ● |  |  | ● |
| D6 |  |  | ● | ● |  | ● |  |
| D7 | ● |  | ● | ● |  |  |  |
| D8 | ● |  |  | ● |  | ● |  |
| D9 |  | ● |  | ● |  | ● |  |
| D10 | ● | ● |  |  |  | ● |  |
| D11 | ● |  | ● |  |  | ● |  |
| REV | ● | ● |  |  |  |  | ● |

PLANETARY GEAR TRAIN OF AUTOMATIC TRANSMISSION FOR VEHICLE

CROSS-REFERENCE TO RELATED APPLICATION

This application is a Continuation-In-Part of U.S. patent application Ser. No. 14/941,400, filed Nov. 13, 2015, which claims priority to Korean Patent Application No. 10-2015-0063353 filed in the Korean Intellectual Property Office on May 6, 2015, the disclosure of which is incorporated herein by reference.

BACKGROUND OF THE INVENTION

Field of the Invention

The present invention relates to an automatic transmission for a vehicle. More particularly, the present invention relates to a planetary gear train of an automatic transmission for a vehicle, which is configured for implementing at least ten forward speeds using a minimum number of configurations, improving power transmission performance and fuel efficiency by increasing a span of a gear shift ratio, and ensuring uniformity (linearity of graph) of ratios between gear shift stages.

Description of Related art

Research on realizing more shift-stages of an automatic transmission are undertaken to achieve enhancement of fuel consumption and better drivability, and recently, increase of oil price is triggering a hard competition in enhancing fuel consumption of a vehicle.

In this sense, research on an engine has been undertaken to achieve weight reduction and to enhance fuel consumption by so-called downsizing and research on an automatic transmission has been performed to simultaneously provide better drivability and fuel consumption by achieving more shift stages.

In order to achieve more shift stages for an automatic transmission, the number of parts is typically increased, which may deteriorate installability, production cost, weight and/or power flow efficiency.

Therefore, in order to maximally enhance fuel consumption of an automatic transmission having more shift stages, it is important for better efficiency to be derived by a smaller number of parts.

In this respect, an eight-speed automatic transmission has been recently introduced, and a planetary gear train for an automatic transmission enabling more shift stages is under investigation.

An automatic transmission of eight or more shift-stages typically includes three to four planetary gear sets and five to seven control elements (frictional elements), and may easily become lengthy, thereby deteriorating installability.

In this regard, disposing planetary gear sets in parallel or employing dog clutches instead of wet-type control elements is sometimes attempted. However, such an arrangement may not be widely applicable, and using dog clutches may easily deteriorate shift-feel.

In addition, considering that gear ratio spans of recently developed eight-speed automatic transmissions are typically between 6.5 and 7.5, fuel consumption enhancement is not very large, and in the case of a gear ratio span of an eight-speed automatic transmission having a level above 9.0, it is difficult to maintain step ratios between adjacent shift stages to be linear, by which driving efficiency of an engine and drivability of a vehicle deteriorated.

Thus, researches studies are under investigation for developing a high efficiency automatic transmission having nine or more speeds.

The information disclosed in this Background of the Invention section is only for enhancement of understanding of the general background of the invention and should not be taken as an acknowledgement or any form of suggestion that this information forms the prior art already known to a person skilled in the art.

SUMMARY OF THE INVENTION

Various aspects of the present invention are directed to providing a planetary gear train of an automatic transmission for a vehicle having advantages of, by minimal complexity, realizing at least ten forward speeds and one reverse speed, increasing a gear ratio span to improve power delivery performance and fuel consumption, and achieving uniformity (linearity of graph) of ratios between gear shift stages.

A planetary gear train according to an exemplary embodiment of the present invention may include an input shaft receiving an engine torque, an output shaft outputting a shifted torque, a first planetary gear set having first, second and third rotation elements, a second planetary gear set having fourth, fifth, and sixth rotation elements, a third planetary gear set having seventh, eighth, and ninth rotation elements, a fourth planetary gear set having tenth, eleventh, and twelfth rotation elements, a first shaft connected with the first rotation element and selectively connectable with a transmission housing, a second shaft interconnecting the second rotation element and the fourth rotation element, and connected with the input shaft, a third shaft interconnecting the third rotation element and the tenth rotation element, a fourth shaft connected with the fifth rotation element, a fifth shaft interconnecting the sixth rotation element and the seventh rotation element, and selectively connectable with the first shaft, a sixth shaft connected with the eighth rotation element and selectively connectable with the respective third shaft and fourth shaft and selectively connectable with the transmission housing, a seventh shaft interconnecting the ninth rotation element and the twelfth rotation element, and selectively connectable with the transmission housing, and an eighth shaft connected with the eleventh rotation element and connected with the output shaft.

In addition, the second shaft may be selectively connectable with the fifth shaft.

On the other hand, the second shaft may be selectively connectable with the fourth shaft.

The first, second and third rotation elements of the first planetary gear set may be respectively a first sun gear, a first planet carrier, and a first ring gear of the first planetary gear set. The fourth, fifth, and sixth rotation elements of the second planetary gear set may be respectively a second sun gear, a second planet carrier, and a second ring gear of the second planetary gear set. The seventh, eighth, and ninth rotation elements of the third planetary gear set may be respectively a third sun gear, a third planet carrier, and a third ring gear of the third planetary gear set. The tenth, eleventh, and twelfth rotation elements of the fourth planetary gear set may be respectively a fourth sun gear, a fourth planet carrier, and a fourth ring gear of the fourth planetary gear set.

In addition, the first, second, third and fourth planetary gear sets may be arranged in the order of the third, second, first, and fourth planetary gear sets, from an engine side.

On the other hand, the first, second, third and fourth planetary gear sets may be arranged in the order of first, second, third and fourth planetary gear sets, from an engine side.

In addition, a planetary gear train according to an exemplary embodiment of the present invention may further include a first clutch selectively connecting the third shaft and the sixth shaft, a second clutch selectively connecting the first shaft and the fifth shaft, a third clutch selectively connecting the second shaft and the fifth shaft, a fourth clutch selectively connecting the fourth shaft and the sixth shaft, a first brake selectively connecting the seventh shaft to the transmission housing, a second brake selectively connecting the first shaft to the transmission housing, and a third brake selectively connecting the sixth shaft to the transmission housing.

On the other hand, a planetary gear train according to an exemplary embodiment of the present invention may further include a first clutch selectively connecting the third shaft and the sixth shaft, a second clutch selectively connecting the first shaft and the fifth shaft, a third clutch selectively connecting the second shaft and the fourth shaft, a fourth clutch selectively connecting the fourth shaft and the sixth shaft, a first brake selectively connecting the seventh shaft to the transmission housing, a second brake selectively connecting the first shaft to the transmission housing, and a third brake selectively connecting the sixth shaft to the transmission housing.

In addition, shift-stages which are implemented by selectively operating the first, second, third and fourth clutches and the first, second and third brakes may include a first forward speed shift-stage implemented by simultaneously operating the first clutch and second clutch and the first brake, a second forward speed shift-stage implemented by simultaneously operating the second and third clutches and the first brake, a third forward speed shift-stage implemented by simultaneously operating the second clutch and the first and third brakes, a fourth forward speed shift-stage implemented by simultaneously operating the second and fourth clutches and the first brake, a fifth forward speed shift-stage implemented by simultaneously operating the second and fourth clutches and the second brake, a forward sixth forward speed shift-stage implemented by simultaneously operating the second, third, and fourth clutches, a seventh forward speed shift-stage implemented by simultaneously operating the third and fourth clutches and the second brake, an eighth forward speed shift-stage implemented by simultaneously operating the first and fourth clutches and the second brake, a ninth forward speed shift-stage implemented by simultaneously operating the first and third clutches and the second brake, a forward tenth speed shift-stage implemented by simultaneously operating the first clutch and second clutch and the second brake, and a reverse speed shift-stage implemented by simultaneously operating the first and third clutches and the third brake.

On the other hand, shift-stages which are implemented by selectively operating the first, second, third and fourth clutches and the first, second and third brakes may include a first forward speed shift-stage implemented by simultaneously operating the first clutch and second clutch and the first brake, a second forward speed shift-stage implemented by simultaneously operating the second and third clutches and the first brake, a third forward speed shift-stage implemented by simultaneously operating the second clutch and the first and second brakes, a fourth forward speed shift-stage implemented by simultaneously operating the second and fourth clutches and the first brake, a fifth forward speed shift-stage implemented by simultaneously operating the second and fourth clutches and the second brake, a forward sixth forward speed shift-stage implemented by simultaneously operating the second, third, and fourth clutches, a seventh forward speed shift-stage implemented by simultaneously operating the third and fourth clutches and the second brake, an eighth forward speed shift-stage implemented by simultaneously operating the first and fourth clutches and the second brake, a ninth forward speed shift-stage implemented by simultaneously operating the first and third clutches and the second brake, a forward tenth speed shift-stage implemented by simultaneously operating the first clutch and second clutch and the second brake, and a reverse speed shift-stage implemented by simultaneously operating the first and third clutches and the third brake.

Furthermore, shift-stages which are implemented by selectively operating the first, second, third and fourth clutches and the first, second and third brakes may include a first forward speed shift-stage implemented by simultaneously operating the second and third clutches and the first brake, a second forward speed shift-stage implemented by simultaneously operating the first and third clutches and the first brake, a third forward speed shift-stage implemented by simultaneously operating the third clutch and the first and third brakes, a fourth forward speed shift-stage implemented by simultaneously operating the third and fourth clutches and the first brake, a fifth forward speed shift-stage implemented by simultaneously operating the third and fourth clutches and the third brake, a forward sixth forward speed shift-stage implemented by simultaneously operating the third and fourth clutches and the second brake, a seventh forward speed shift-stage implemented by simultaneously operating the first, third and fourth clutches, an eighth forward speed shift-stage implemented by simultaneously operating the first and fourth clutches and the second brake, a ninth forward speed shift-stage implemented by simultaneously operating the second and fourth clutches and the second brake, a forward tenth speed shift-stage implemented by simultaneously operating the first clutch and second clutch and the second brake, an eleventh forward speed shift-stage implemented by simultaneously operating the first and third clutches and the second brake; and, a reverse speed shift-stage implemented by simultaneously operating the first clutch and second clutch and the third brake.

A planetary gear train according to an exemplary embodiment of the present invention may realize ten or eleven forward speeds and one reverse speed formed by operating the four planetary gear sets as simple planetary gear sets by controlling seven control elements.

In addition, according to a planetary gear train according to an exemplary embodiment of the present invention, a gear ratio span of more than 9.0 may be ensured, maximizing an engine driving efficiency.

In addition, the linearity of step ratios of shift stages is secured while multi-staging the shift stage with high efficiency, making it possible to improve drivability including acceleration before and after a shift, an engine speed rhythmic sense, and the like.

Further, effects that can be obtained or expected from exemplary embodiments of the present invention are directly or suggestively described in the following detailed description. That is, various effects expected from exemplary embodiments of the present invention will be described in the following detailed description.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operational chart for respective control elements at respective shift-stages in a planetary gear train according to a first exemplary embodiment of the present invention.

FIG. 3 is an operational chart for respective control elements of the other instance at respective shift-stages in a planetary gear train according to a first exemplary embodiment of the present invention.

FIG. 4 is an operational chart for respective control elements of another instance at respective shift-stages in a planetary gear train according to a first exemplary embodiment of the present invention.

Figure 1:
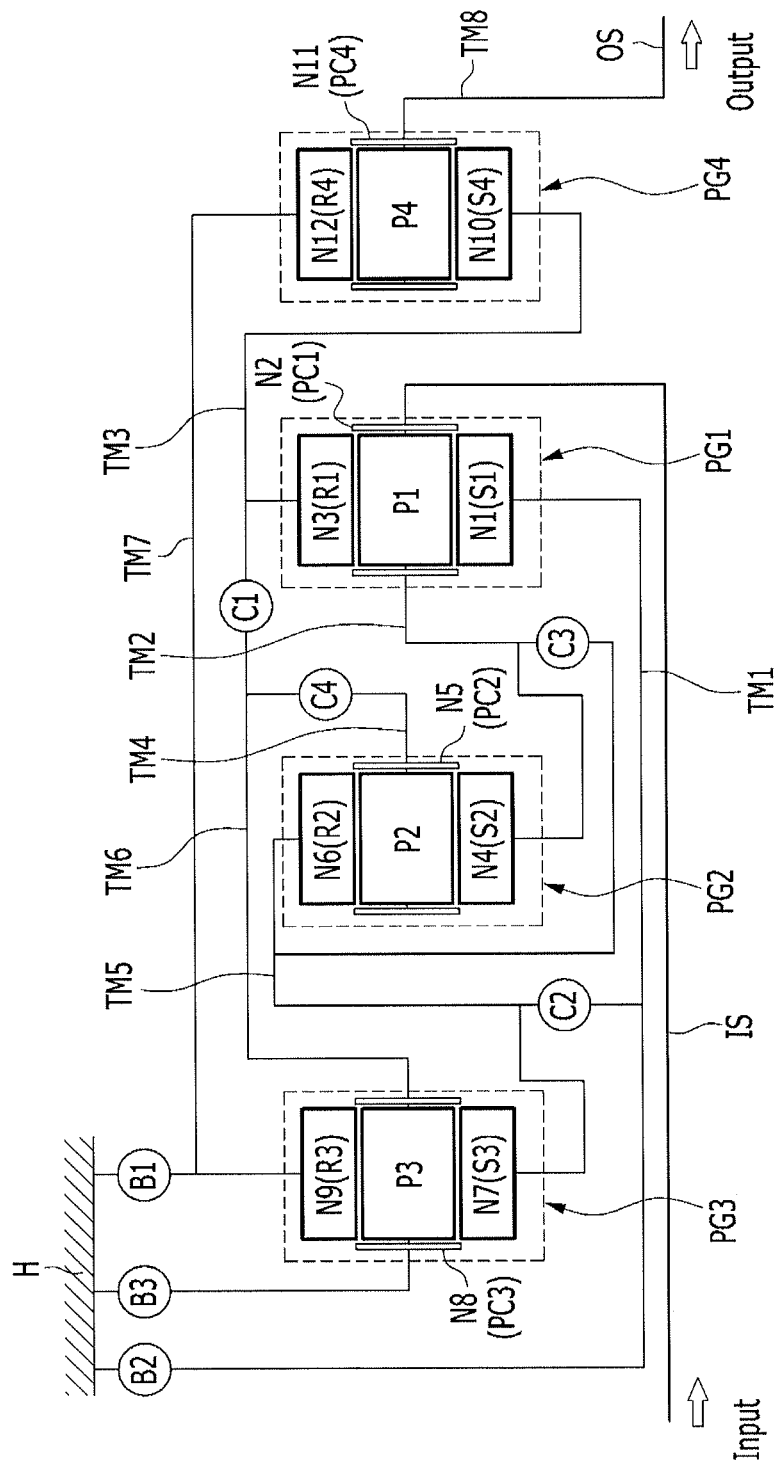
FIG. 1 is a schematic diagram of a planetary gear train according to a first exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE EMBODIMENTS

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described in detail with reference to drawings.

The drawings and description are to be regarded as illustrative in nature and not restrictive, and like reference numerals designate like elements throughout the specification.

In the following description, dividing names of components into first, second, and the like is to divide the names because the names of the components are the same as each other and an order thereof is not particularly limited.

FIG. 1 is a schematic diagram of a planetary gear train according to a first exemplary embodiment of the present invention.

Referring to FIG. 1, a planetary gear train according to a first exemplary embodiment of the present invention includes first, second, third, and four planetary gear sets PG1, PG2, PG3, and PG4 arranged on a same axis, an input shaft IS, an output shaft OS, eight shafts TM1 to TM8 interconnecting rotation elements of the first, second, third, and four planetary gear sets PG1, PG2, PG3, and PG4, four clutches C1 to C4 and three brakes B1 to B3 as control elements, and a transmission housing H.

Torque input from the input shaft IS is shifted by cooperative operation of the first, second, third and fourth planetary gear sets PG1, PG2, PG3, and PG4, and then output through the output shaft OS.

The planetary gear sets are arranged in the order of the third, second, first, and fourth planetary gear sets PG3, PG2, PG1, and PG4, from an engine side.

The input shaft IS is an input member and the torque from a crankshaft of an engine is input into the input shaft IS, after being torque-converted through a torque converter.

The output shaft OS is an output element, and being arranged on a same axis with the input shaft IS, delivers a shifted driving torque to a drive shaft through a differential apparatus.

The first planetary gear set PG1 is a single pinion planetary gear set, and includes a first sun gear S1, a first planet carrier PC1 that supports first pinion gear P1 externally engaged with the first sun gear S1, and a first ring gear R1 that is internally engaged with the first pinion gear P1. The first sun gear S1 acts as a first rotation element N1, the first planet carrier PC1 acts as a second rotation element N2, and the first ring gear R1 acts as a third rotation element N3.

The second planetary gear set PG2 is a single pinion planetary gear set, and includes a second sun gear S2, a second planet carrier PC2 that supports second pinion gear P2 externally engaged with the second sun gear S2, and a second ring gear R2 that is internally engaged with the second pinion gear P2. The second sun gear S2 acts as a fourth rotation element N4, the second planet carrier PC2 acts as a fifth rotation element N4, and the second ring gear R2 acts as a sixth rotation element N6.

The third planetary gear set PG3 is a single pinion planetary gear set, and includes a third sun gear S3, a third planet carrier PC3 that supports third pinion gear P3 externally engaged with the third sun gear S3, and a third ring gear R3 that is internally engaged with the third pinion gear P3. The third sun gear S3 acts as a seventh rotation element N7, the third planet carrier PC3 acts as an eighth rotation element N8, and the third ring gear R3 acts as a ninth rotation element N9.

The fourth planetary gear set PG4 is a single pinion planetary gear set, and includes a fourth sun gear S4, a fourth planet carrier PC4 that supports fourth pinion gear P4 externally engaged with the fourth sun gear S4, and a fourth ring gear R4 that is internally engaged with the fourth pinion gear P4. The fourth sun gear S4 acts as a tenth rotation element N10, the fourth planet carrier PC4 acts as an eleventh rotation element N11, and the fourth ring gear R4 acts as a twelfth rotation element N12.

Herein, In the arrangement of the first, second, third and fourth planetary gear sets PG1, PG2, PG3, and PG4, the second rotation element N2 is directly connected with the fourth rotation element N4, the third rotation element N3 is directly connected with the tenth rotation element N10, the sixth rotation element N6 is directly connected with the seventh rotation element N7, and the ninth rotation element N9 is directly connected with the twelfth rotation element N12, by eight shafts TM1 to TM8.

The eight shafts TM1 to TM8 are arranged as follows.

Each of the eight shafts TM1 to TM8 may be a rotation memberrotation member that directly or selectively interconnects the input and output shafts with rotation elements of the planetary gear sets PG1, PG2, PG3, and PG4, or may be a fixed member that directly or selectively interconnects the rotation elements with the transmission housing H to fix the rotation elements.

The first shaft TM1 is connected with the first rotation element N1 (first sun gear S1), and selectively connectable with the transmission housing H, selectively acting as a fixed element.

The second shaft TM2 directly connects the second rotation element N2 (the first planet carrier PC1) and the fourth rotation element N4 (the second sun gear S2), and is directly connected with the input shaft IS, always acting as an input element.

The third shaft TM3 connects the third rotation element N3 (the first ring gear R1} and the tenth rotation element N10 (the fourth sun gear S4).

The fourth shaft TM4 is connected with the fifth rotation element N5 (the second planet carrier PC2).

The fifth shaft TM5 connects the sixth rotation element N6 (the second ring gear R2) and the seventh rotation element N7 (the third sun gear S3), and is selectively connectable with the first shaft TM1 and the second shaft TM2.

The sixth shaft TM6 is connected with the eighth rotation element N8 (the third planet carrier PC3) and is selectively connectable with the respective third shaft TM3 and fourth shaft TM4, and is selectively connectable with the transmission housing H, selectively acting as a fixed element.

The seventh shaft TM7 connects the ninth rotation element N9 (the third ring gear R3) and the twelfth rotation element N12 (the fourth ring gear R4), and is selectively connectable with the transmission housing H, selectively acting as a fixed element.

The eighth shaft TM8 is connected with the eleventh rotation element N11 (the fourth planet carrier PC4), and directly connected with the output shaft OS, always acting as an output element.

The eight shafts TM1 to TM8, the input shaft IS, and the output shaft OS may be selectively interconnected with one another by control elements of four clutches C1, C2, C3, and C4.

The eight shafts TM1 to TM8 may be selectively connectable with the transmission housing H, by control elements of three brakes B1, B2, and B3.

The four clutches C1 to C4 and the three brakes B1 to B3 are arranged as follows.

The first clutch C1 is positioned between the third shaft TM3 and the sixth shaft TM6, and selectively connects the third shaft TM3 and the sixth shaft TM6, controlling power delivery therebetween.

The second clutch C2 is positioned between the first shaft TM1 and the fifth shaft TM5, and selectively connects the first shaft TM1 and the fifth shaft TM5, controlling power delivery therebetween.

The third clutch C3 is positioned between the second shaft TM2 and the fifth shaft TM5, and selectively connects the second shaft TM2 and the fifth shaft TM5, controlling power delivery therebetween.

The fourth clutch C4 is positioned between the fourth shaft TM4 and the sixth shaft TM6, and selectively connects the fourth shaft TM4 and the sixth shaft TM6, controlling power delivery therebetween.

The first brake B1 is positioned between the seventh shaft TM7 and the transmission housing H, and selectively connects the seventh shaft TM7 to the transmission housing H.

The second brake B2 is positioned between the first shaft TM1 and the transmission housing H, and selectively connects the first shaft TM1 to the transmission housing H.

The third brake B3 is positioned between the sixth shaft TM6 and the transmission housing H, and selectively connects the sixth shaft TM6 to the transmission housing H.

The respective control elements of the first, second, third and fourth clutches C1, C2, C3, and C4 and the first, second and third brakes B1, B2, and B3 may be realized as multi-plate hydraulic pressure friction devices that are frictionally engaged by hydraulic pressure.

FIG. 2 is an operational chart for respective control elements at respective shift-stages in a planetary gear train according to a first exemplary embodiment of the present invention.

Referring to FIG. 2, a planetary gear train according to a first exemplary embodiment of the present invention realizes ten forward speeds and one reverse speed by operating three control elements among the first, second, third and fourth clutches C1, C2, C3, and C4 and the first, second and third brakes B1, B2, and B3 at respective shift-stages.

In the first forward speed shift-stage D1, the first clutch and second clutch C1 and C2 and the first brake B1 are simultaneously operated.

As a result, on a state that the third shaft TM3 is connected with the sixth shaft TM6 by the operation of the first clutch C1 and the first shaft TM1 is connected with the fifth shaft TM5 by the operation of the second clutch C2, the torque of the input shaft IS is input to the second shaft TM2.

In addition, the seventh shaft TM7 acts as a fixed element by the operation of the first brake B1, realizing the first forward speed by cooperative operation of respective shafts and outputting a shifted torque to the output shaft OS connected with the eighth shaft TM8.

In the second forward speed shift-stage D2, the second and third clutches C2 and C3 and the first brake B1 are simultaneously operated.

As a result, on a state that the first shaft TM1 is connected with the fifth shaft TM5 by the operation of the second clutch C2 and the second shaft TM2 is connected with the fifth shaft TM5 by the operation of third clutch C3, the torque of the input shaft IS is input to the second shaft TM2.

In addition, the seventh shaft TM7 acts as a fixed element by the operation of the first brake B1, realizing the second forward speed by cooperative operation of respective shafts and outputting a shifted torque to the output shaft OS connected with the eighth shaft TM8.

In the third forward speed shift-stage D3, the second clutch C2 and the first and third brakes B1 and B3 are simultaneously operated.

As a result, on a state that the first shaft TM1 is connected with the fifth shaft TM5 by the operation of the second clutch C2, the torque of the input shaft IS is input to the second shaft TM2.

In addition, the seventh shaft TM7 and the sixth shaft TM6 act as fixed elements by the operation of the first and third brakes B1 and B3, realizing the third forward speed by cooperative operation of respective shafts and outputting a shifted torque to the output shaft OS connected with the eighth shaft TM8.

In the fourth forward speed shift-stage D4, the second and fourth clutches C2 and C4 and the first brake B1 are simultaneously operated.

As a result, on a state that the first shaft TM1 is connected with the fifth shaft TM5 by the operation of the second clutch C2 and the fourth shaft TM4 is connected with the sixth shaft TM6 by the operation of the fourth clutch C4, the torque of the input shaft IS is input to the second shaft TM2.

In addition, the seventh shaft TM7 acts as a fixed element by the operation of the first brakes B1, realizing the fourth forward speed by cooperative operation of respective shafts and outputting a shifted torque to the output shaft OS connected with the eighth shaft TM8.

In the fifth forward speed shift-stage D5, the second and fourth clutches C2 and C4 and the second brake B2 are simultaneously operated.

As a result, on a state that the first shaft TM1 is connected with the fifth shaft TM5 by the operation of the second clutch C2 and the fourth shaft TM4 is connected with the sixth shaft TM6 by the operation of the fourth clutch C4, the torque of the input shaft IS is input to the second shaft TM2.

In addition, the first shaft TM1 acts as a fixed element by the operation of the second brake B2, realizing the fifth forward speed by cooperative operation of respective shafts and outputting a shifted torque to the output shaft OS connected with the eighth shaft TM8.

In the forward sixth forward speed shift-stage D6, the second, third, and fourth clutches C2, C3, and C4 are simultaneously operated.

As a result, on a state that the first shaft TM1 is connected with the fifth shaft TM5 by the operation of the second clutch C2 and the second shaft TM2 is connected with the fifth shaft TM5 by the operation the third clutch C3 and the fourth shaft TM4 is connected with the sixth shaft TM6 by the operation of the fourth clutch C4, the torque of the input shaft IS is input to the second shaft TM2.

In the instant case, the first, second, third and fourth planetary gear sets PG1, PG2, PG3, and PG4 integrally rotate, and a torque is outputted as inputted, forming the forward sixth forward speed and outputting the inputted torque to the output shaft OS connected with the eighth shaft TM8.

In the seventh forward speed shift-stage D7, the third and fourth clutches C3 and C4 and the second brake B2 are simultaneously operated.

As a result, on a state that the second shaft TM2 is connected with the fifth shaft TM5 by the operation of the third clutch C3 and the fourth shaft TM4 is connected with the sixth shaft TM6 by the operation of the fourth clutch C4, the torque of the input shaft IS is input to the second shaft TM2.

In addition, the first shaft TM1 acts as a fixed element by the operation of the second brake B2, realizing the seventh forward speed by cooperative operation of respective shafts and outputting a shifted torque to the output shaft OS connected with the eighth shaft TM8.

In the eighth forward speed shift-stage D8, the first and fourth clutches C1 and C4 and the second brake B2 are simultaneously operated.

As a result, on a state that the third shaft TM3 is connected with the sixth shaft TM6 by the operation of the first clutch C1 and the fourth shaft TM4 is connected with the sixth shaft TM6 by the operation of the fourth clutch C4, the torque of the input shaft IS is input to the second shaft TM2.

In addition, the first shaft TM1 acts as a fixed element by the operation of the second brake B2, realizing the eighth forward speed by cooperative operation of respective shafts and outputting a shifted torque to the output shaft OS connected with the eighth shaft TM8.

In the ninth forward speed shift-stage D9, the first and third clutches C1 and C3 and the second brake B2 are simultaneously operated.

As a result, on a state that the third shaft TM3 is connected with the sixth shaft TM6 by the operation of the first clutch C1 and the second shaft TM2 is connected with the fifth shaft TM5 by the operation of the third clutch C3, the torque of the input shaft IS is input to the second shaft TM2.

In addition, the first shaft TM1 acts as a fixed element by the operation of the second brake B2, realizing the ninth forward speed by cooperative operation of respective shafts and outputting a shifted torque to the output shaft OS connected with the eighth shaft TM8.

In the forward tenth speed shift-stage D10, the first clutch and second clutch C1 and C2 and the second brake B2 are simultaneously operated.

As a result, on a state that the third shaft TM3 is connected with the sixth shaft TM6 by the operation of the first clutch C1 and the first shaft TM1 is connected with the fifth shaft TM5 the operation of the second clutch C2, the torque of the input shaft IS is input to the second shaft TM2.

In addition, the first shaft TM1 acts as a fixed element by the operation of the second brake B2, realizing the forward tenth speed by cooperative operation of respective shafts and outputting a shifted torque to the output shaft OS connected with the eighth shaft TM8.

In the reverse speed shift-stage REV, the first and third clutches C1 and C3 and the third brake B3 are simultaneously operated.

As a result, on a state that the third shaft TM3 is connected with the sixth shaft TM6 by the operation of the first clutch C1 and the second shaft TM2 is connected with the fifth shaft TM5 by the operation of the third clutch C3, the torque of the input shaft IS is input to the second shaft TM2.

In addition, the sixth shaft TM6 acts as a fixed element by the operation of the third brake B3, realizing the reverse speed by cooperative operation of respective shafts and outputting a shifted torque to the output shaft OS connected with the eighth shaft TM8.

FIG. 3 is an operational chart for respective control elements of the other instance at respective shift-stages in a planetary gear train according to a first exemplary embodiment of the present invention.

Referring to FIG. 3, a planetary gear train according to a first exemplary embodiment of the present invention may realize the third forward speed shift-stage D3 by simultaneously operating the second clutch C2 and the first and second brakes B1 and B2 as shown in the operational chart at respective shift-stages according to the other instance.

That is, even though gear ratio is to be different, the third forward speed shift-stage D3 is realized by operating the second brake B2 instead of the third brake B3.

As a result, on a state that the first shaft TM1 is connected with the fifth shaft TM5 by the operation of the second clutch C2, the torque of the input shaft IS is input to the second shaft TM2.

In addition, the seventh shaft TM7 and the first shaft TM1 act as fixed elements by the operation of the first and second brakes B1 and B2, realizing the third forward speed by cooperative operation of respective shafts and outputting a shifted torque to the output shaft OS which is connected with the eighth shaft TM8.

FIG. 4 is an operational chart for respective control elements of another instance at respective shift-stages in a planetary gear train according to a first exemplary embodiment of the present invention.

Referring to FIG. 4, a planetary gear train according to a first exemplary embodiment of the present invention realizes eleven forward speeds and one reverse speed by operating three control elements among the first, second, third and fourth clutches C1, C2, C3, and C4 and the first, second and third brakes B1, B2, and B3 at respective shift-stages as shown in the operational chart at respective shift-stages according to another instance.

In the first forward speed shift-stage D1, the second and third clutches C2 and C3 and the first brake B1 are simultaneously operated.

As a result, on a state that the first shaft TM1 is connected with the fifth shaft TM5 by the operation of the second clutch C2 and the second shaft TM2 is connected with the fifth shaft TM5 by the operation of the third clutch C3, the torque of the input shaft IS is input to the second shaft TM2.

In addition, the seventh shaft TM7 acts as a fixed element by the operation of the first brake B1, realizing the first forward speed by cooperative operation of respective shafts and outputting a shifted torque to the output shaft OS connected with the eighth shaft TM8.

In the second forward speed shift-stage D2, the first and third clutches C1 and C3 and the first brake B1 are simultaneously operated.

As a result, on a state that the third shaft TM3 is connected with the sixth shaft TM6 by the operation of the first clutch C1 and the second shaft TM2 is connected with the fifth shaft TM5 by the operation of third clutch C3, the torque of the input shaft IS is input to the second shaft TM2.

In addition, the seventh shaft TM7 acts as a fixed element by the operation of the first brake B1, realizing the second forward speed by cooperative operation of respective shafts and outputting a shifted torque to the output shaft OS connected with the eighth shaft TM8.

In the third forward speed shift-stage D3, the third clutch C3 and the first and third brakes B1 and B3 are simultaneously operated.

As a result, on a state that the second shaft TM2 is connected with the fifth shaft TM5 by the operation of the third clutch C3, the torque of the input shaft IS is input to the second shaft TM2.

In addition, the seventh shaft TM7 and the sixth shaft TM6 act as fixed elements by the operation of the first and third brakes B1 and B3, realizing the third forward speed by cooperative operation of respective shafts and outputting a shifted torque to the output shaft OS connected with the eighth shaft TM8.

In the fourth forward speed shift-stage D4, the third and fourth clutches C3 and C4 and the first brake B1 are simultaneously operated.

As a result, on a state that the second shaft TM2 is connected with the fifth shaft TM5 by the operation of the third clutch C3 and the fourth shaft TM4 is connected with the sixth shaft TM6 by the operation of the fourth clutch C4, the torque of the input shaft IS is input to the second shaft TM2.

In addition, the seventh shaft TM7 acts as a fixed element by the operation of the first brakes B1, realizing the fourth forward speed by cooperative operation of respective shafts and outputting a shifted torque to the output shaft OS connected with the eighth shaft TM8.

In the fifth forward speed shift-stage D5, the third and fourth clutches C3 and C4 and the third brake B3 are simultaneously operated.

As a result, on a state that the second shaft TM2 is connected with the fifth shaft TM5 by the operation of the third clutch C3 and the fourth shaft TM4 is connected with the sixth shaft TM6 by the operation of the fourth clutch C4, the torque of the input shaft IS is input to the second shaft TM2.

In addition, the sixth shaft TM6 acts as a fixed element by the operation of the third brake B3, realizing the fifth forward speed by cooperative operation of respective shafts and outputting a shifted torque to the output shaft OS connected with the eighth shaft TM8.

In the forward sixth forward speed shift-stage D6, the third and fourth clutches C3 and C4 and the second brake B2 are simultaneously operated.

As a result, on a state that the second shaft TM2 is connected with the fifth shaft TM5 by the operation the third clutch C3 and the fourth shaft TM4 is connected with the sixth shaft TM6 by the operation of the fourth clutch C4, the torque of the input shaft IS is input to the second shaft TM2.

In addition, the first shaft TM1 acts as a fixed element by the operation of the second brake B2, realizing the forward sixth forward speed by cooperative operation of respective shafts and outputting a shifted torque to the output shaft OS connected with the eighth shaft TM8.

In the seventh forward speed shift-stage D7, the first, third, and fourth clutches C1, C3, and C4 are simultaneously operated.

As a result, on a state that the third shaft TM3 is connected with the sixth shaft TM6 by the operation of the first clutch C1 and the second shaft TM2 is connected with the fifth shaft TM5 by the operation the third clutch C3 and the fourth shaft TM4 is connected with the sixth shaft TM6 by the operation of the fourth clutch C4, the torque of the input shaft IS is input to the second shaft TM2.

In the instant case, the first, second, third and fourth planetary gear sets PG1, PG2, PG3, and PG4 integrally rotate, and a torque is outputted as inputted, forming the seventh forward speed and outputting the inputted torque to the output shaft OS connected with the eighth shaft TM8.

In the eighth forward speed shift-stage D8, the first and fourth clutches C1 and C4 and the second brake B2 are simultaneously operated.

As a result, on a state that the third shaft TM3 is connected with the sixth shaft TM6 by the operation of the first clutch C1 and the fourth shaft TM4 is connected with the sixth shaft TM6 by the operation of the fourth clutch C4, the torque of the input shaft IS is input to the second shaft TM2.

In addition, the first shaft TM1 acts as a fixed element by the operation of the second brake B2, realizing the eighth forward speed by cooperative operation of respective shafts and outputting a shifted torque to the output shaft OS connected with the eighth shaft TM8.

In the ninth forward speed shift-stage D9, the second and fourth clutches C2 and C4 and the second brake B2 are simultaneously operated.

As a result, on a state that the first shaft TM1 is connected with the fifth shaft TM5 by the operation of the second clutch C2 and the fourth shaft TM4 is connected with the sixth shaft TM6 by the operation of the fourth clutch C4, the torque of the input shaft IS is input to the second shaft TM2.

In addition, the first shaft TM1 acts as a fixed element by the operation of the second brake B2, realizing the ninth forward speed by cooperative operation of respective shafts and outputting a shifted torque to the output shaft OS connected with the eighth shaft TM8.

In the forward tenth speed shift-stage D10, the first clutch and second clutch C1 and C2 and the second brake B2 are simultaneously operated.

As a result, on a state that the third shaft TM3 is connected with the sixth shaft TM6 by the operation of the first clutch C1 and the first shaft TM1 is connected with the fifth shaft TM5 the operation of the second clutch C2, the torque of the input shaft IS is input to the second shaft TM2.

In addition, the first shaft TM1 acts as a fixed element by the operation of the second brake B2, realizing the forward tenth speed by cooperative operation of respective shafts and outputting a shifted torque to the output shaft OS connected with the eighth shaft TM8.

In the eleventh forward speed shift-stage D11, the first and third clutches C1 and C3 and the second brake B2 are simultaneously operated.

As a result, on a state that the third shaft TM3 is connected with the sixth shaft TM6 by the operation of the first clutch C1 and the second shaft TM2 is connected with the fifth shaft TM5 the operation of the third clutch C3, the torque of the input shaft IS is input to the second shaft TM2.

In addition, the first shaft TM1 acts as a fixed element by the operation of the second brake B2, realizing the eleventh forward speed by cooperative operation of respective shafts and outputting a shifted torque to the output shaft OS connected with the eighth shaft TM8.

In the reverse speed shift-stage REV, the first clutch and second clutch C1 and C2 and the third brake B3 are simultaneously operated.

As a result, on a state that the third shaft TM3 is connected with the sixth shaft TM6 by the operation of the first clutch C1 and the first shaft TM1 is connected with the fifth shaft TM5 by the operation of the second clutch C2, the torque of the input shaft IS is input to the second shaft TM2.

In addition, the sixth shaft TM6 acts as a fixed element by the operation of the third brake B3, realizing the reverse speed by cooperative operation of respective shafts and outputting a shifted torque to the output shaft OS connected with the eighth shaft TM8.

Figure 5:
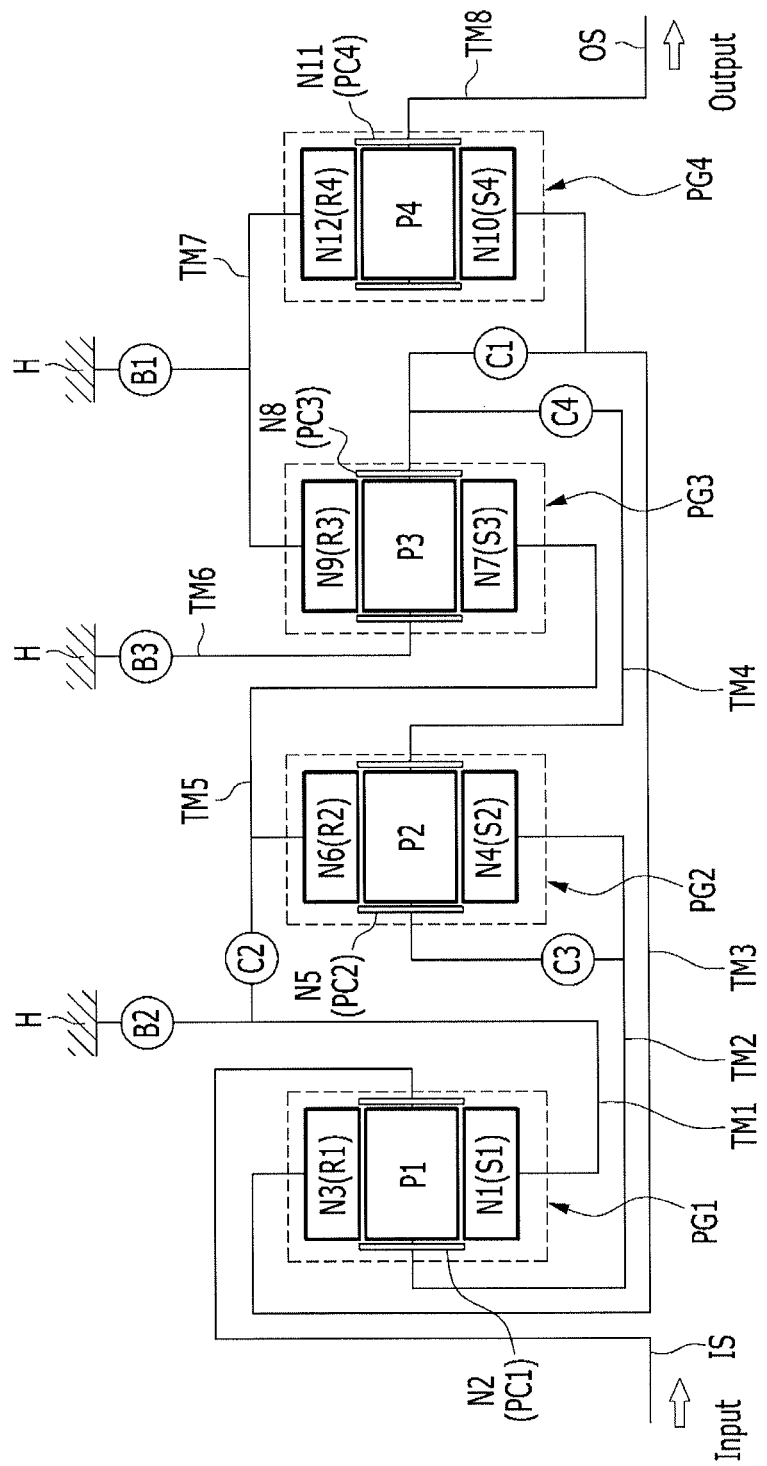
FIG. 5 is a schematic diagram of a planetary gear train according to a second exemplary embodiment of the present invention.

FIG. 5 is a schematic diagram of a planetary gear train according to a second exemplary embodiment of the present invention.

Referring to FIG. 5, according to the first exemplary embodiment, the first, second, third and fourth planetary gear sets PG1, PG2, PG3, and PG4 are arranged in the order of the third, second, first, and fourth planetary gear sets PG3, PG2, PG1, and PG4, from an engine side, and the third clutch C3 is disposed between the second shaft TM2 and the fifth shaft TM5 to selectively connect the second shaft TM2 with the fifth shaft TM5 such that the second planetary gear set PG2 is integrally rotated, but according to the second exemplary embodiment, the first, second, third and fourth planetary gear sets PG1, PG2, PG3, and PG4 are arranged in the order of first, second, third and fourth planetary gear sets PG1, PG2, PG3, and PG4, from an engine side, and the third clutch C3 is disposed between the second shaft TM2 and the fourth shaft TM4 to selectively connect the second shaft TM2 and the fourth shaft TM4 such that the second planetary gear set PG2 is integrally rotated.

Therefore, the second exemplary embodiment is configured so that the position of the third clutch C3 functioning as device of integrating the second planetary gear set PG2 is only changed depending on the arrangement difference of the first, second, third and fourth planetary gear sets PG1, PG2, and PG3, PG4 in comparison with the first exemplary embodiment, and the connection between the constituent elements except the third clutch C3 and the connection between the constituent elements except the third clutch C3 and the shift-stages forming ten forward speeds being realized by two type and one eleventh forward speed are same to the first exemplary embodiment, so the detail description thereof will be omitted.

As described above, a planetary gear train according to an exemplary embodiment of the present invention may realize ten or eleven forward speeds and one reverse speed formed by operating four planetary gear sets PG1, PG2, PG3, and PG4 by controlling four clutches C1, C2, C3, and C4 and three brakes B1, B2, and B3.

In addition, according to a planetary gear train according to an exemplary embodiment of the present invention, a gear ratio span of more than 9.0 may be ensured, maximizing an engine driving efficiency.

In addition, the linearity of step ratios of shift stages is secured while multi-staging the shift stage with high efficiency, making it possible to improve drivability including acceleration before and after a shift, an engine speed rhythmic sense, and the like.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for a vehicle, comprising:
    an input shaft receiving an engine torque;
    an output shaft outputting a shifted torque;
    a first planetary gear set having a first rotation element, a second rotation element, and a third rotation element;
    a second planetary gear set having a fourth rotation element, a fifth rotation element, and a sixth rotation element;
    a third planetary gear set having a seventh rotation element, an eighth rotation element, and a ninth rotation element;
    a fourth planetary gear set having a tenth rotation element, an eleventh rotation element, and a twelfth rotation element;
    a first shaft connected with the first rotation element and selectively connectable with a transmission housing;
    a second shaft interconnecting the second rotation element and the fourth rotation element, and connected with the input shaft;
    a third shaft interconnecting the third rotation element and the tenth rotation element;
    a fourth shaft connected with the fifth rotation element;
    a fifth shaft interconnecting the sixth rotation element and the seventh rotation element, and selectively connectable with the first shaft;

a sixth shaft connected with the eighth rotation element and selectively connectable with the respective third shaft and fourth shaft and selectively connectable with the transmission housing;
a seventh shaft interconnecting the ninth rotation element and the twelfth rotation element, and selectively connectable with the transmission housing; and
an eighth shaft connected with the eleventh rotation element and connected with the output shaft.

2. The planetary gear train of claim 1, wherein the second shaft is selectively connectable with the fifth shaft.

3. The planetary gear train of claim 1, wherein the second shaft is selectively connectable with the fourth shaft.

4. The planetary gear train of claim 1, wherein
the first, second and third rotation elements of the first planetary gear set are respectively a first sun gear, a first planet carrier, and a first ring gear of the first planetary gear set;
the fourth, fifth, and sixth rotation elements of the second planetary gear set are respectively a second sun gear, a second planet carrier, and a second ring gear of the second planetary gear set;
the seventh rotation element, the eighth rotation element, and the ninth rotation element of the third planetary gear set are respectively a third sun gear, a third planet carrier, and a third ring gear of the third planetary gear set; and
the tenth rotation element, the eleventh rotation element, and the twelfth rotation element of the fourth planetary gear set are respectively a fourth sun gear, a fourth planet carrier, and a fourth ring gear of the fourth planetary gear set.

5. The planetary gear train of claim 2, further comprising:
a first clutch selectively connecting the third shaft and the sixth shaft;
a second clutch selectively connecting the first shaft and the fifth shaft;
a third clutch selectively connecting the second shaft and the fifth shaft;
a fourth clutch selectively connecting the fourth shaft and the sixth shaft;
a first brake selectively connecting the seventh shaft to the transmission housing;
a second brake selectively connecting the first shaft to the transmission housing; and
a third brake selectively connecting the sixth shaft to the transmission housing.

6. The planetary gear train of claim 3, further comprising:
a first clutch selectively connecting the third shaft and the sixth shaft;
a second clutch selectively connecting the first shaft and the fifth shaft;
a third clutch selectively connecting the second shaft and the fourth shaft;
a fourth clutch selectively connecting the fourth shaft and the sixth shaft;
a first brake selectively connecting the seventh shaft to the transmission housing;
a second brake selectively connecting the first shaft to the transmission housing; and
a third brake selectively connecting the sixth shaft to the transmission housing.

7. A planetary gear train of an automatic transmission for a vehicle, including:
an input shaft receiving an engine torque;
an output shaft outputting a shifted torque;
a first planetary gear set having a first rotation element, a second rotation element, and a third rotation element;
a second planetary gear set having a fourth rotation element, a fifth rotation element, and a sixth rotation element;
a third planetary gear set having a seventh rotation element, an eighth rotation element, and a ninth rotation element; and
a fourth planetary gear set having a tenth rotation element, an eleventh rotation element, and a twelfth rotation element,
wherein
the input shaft is connected with the second rotation element;
the output shaft is connected with the eleventh rotation element;
the second rotation element is connected with the fourth rotation element;
the third rotation element is connected with the tenth rotation element;
the sixth rotation element is connected with the seventh rotation element;
the ninth rotation element is connected with the twelfth rotation element;
the first rotation element is selectively connectable with the sixth rotation element;
the third rotation element is selectively connectable with the eighth rotation element; and
the fifth rotation element is selectively connectable with the eighth rotation element.

8. The planetary gear train of claim 7, wherein the fourth rotation element is selectively connectable with the sixth rotation element.

9. The planetary gear train of claim 7, wherein the fourth rotation element is selectively connectable with the fifth rotation element.

10. The planetary gear train of claim 7, wherein the first rotation element, the eighth rotation element, and the ninth rotation element are respectively connected with a transmission housing.

11. The planetary gear train of claim 7, wherein
the first, second and third rotation elements of the first planetary gear set are respectively a first sun gear, a first planet carrier, and a first ring gear of the first planetary gear set;
the fourth, fifth, and sixth rotation elements of the second planetary gear set are respectively a second sun gear, a second planet carrier, and a second ring gear of the second planetary gear set;
the seventh rotation element, the eighth rotation element, and the ninth rotation element of the third planetary gear set are respectively a third sun gear, a third planet carrier, and a third ring gear of the third planetary gear set; and
the tenth rotation element, the eleventh rotation element, and the twelfth rotation element of the fourth planetary gear set are respectively a fourth sun gear, a fourth planet carrier, and a fourth ring gear of the fourth planetary gear set.

12. The planetary gear train of claim 10, further including:
a first clutch selectively connecting the third rotation element and the eighth rotation element;
a second clutch selectively connecting the first rotation element and the sixth rotation element;
a third clutch selectively connecting the fourth rotation element and the sixth rotation element;

a fourth clutch selectively connecting the fifth rotation element and the eighth rotation element;
a first brake selectively connecting the ninth rotation element to the transmission housing;
a second brake selectively connecting the first rotation element to the transmission housing; and
a third brake selectively connecting the eighth rotation element to the transmission housing.

13. The planetary gear train of claim 10, further including:
a first clutch selectively connecting the third rotation element and the eighth rotation element;
a second clutch selectively connecting the first rotation element and the sixth rotation element;
a third clutch selectively connecting the fourth rotation element and the fifth rotation element;
a fourth clutch selectively connecting the fifth rotation element and the eighth rotation element;
a first brake selectively connecting the ninth rotation element to the transmission housing;
a second brake selectively connecting the first rotation element to the transmission housing; and
a third brake selectively connecting the eighth rotation element to the transmission housing.

* * * * *